US006750879B2

(12) United States Patent
Sandberg

(10) Patent No.: US 6,750,879 B2
(45) Date of Patent: Jun. 15, 2004

(54) METHOD AND APPARATUS FOR COMMUNICATING CABLE MODEM PROBLEM DEMARCATION THROUGH A GRAPHICAL USER INTERFACE

(75) Inventor: Jabe A. Sandberg, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 09/752,200

(22) Filed: Dec. 30, 2000

(65) Prior Publication Data

US 2002/0122050 A1 Sep. 5, 2002

(51) Int. Cl.$^7$ .................................................. G09G 5/00
(52) U.S. Cl. ........................ 345/714; 345/711; 345/713; 709/224
(58) Field of Search ................................ 345/705, 715, 345/700, 711, 714; 709/224

(56) References Cited

U.S. PATENT DOCUMENTS 5,539,869 A * 7/1996 Spoto et al. ............. 715/500.1
6,134,644 A * 10/2000 Mayuzumi et al. ............ 712/1
6,205,579 B1 * 3/2001 Southgate .................... 717/173
6,272,150 B1 * 8/2001 Hrastar et al. ............... 370/486
6,393,478 B1 * 5/2002 Bahlmann ..................... 709/224
6,507,592 B1 * 1/2003 Hurvig et al. ............... 370/503
6,594,305 B1 * 7/2003 Roeck et al. ................ 375/222

* cited by examiner

Primary Examiner—Kristine Kincaid
Assistant Examiner—Nhon D Nguyen
(74) Attorney, Agent, or Firm—Blakely, Sokoloff, Taylor & Zafman LLP

(57) ABSTRACT

A method and apparatus is provided in which a cable modem diagnostics application communicates problem demarcation and technical support guidance for customer premises equipment controlled cable modems through a graphical user interface (GUI). The GUI presents problem demarcation hierarchically into a software, hardware, and cable network category so that the overall status is instantly visible with minimal or no user action. Icons, colors, and sounds are used to direct the user to the exact cause of the problem within the relevant category. The user is guided to first correct the problem, and then if necessary is further guided to the correct technical support contact information, thereby reducing the customer support burden in servicing cable modem users.

25 Claims, 13 Drawing Sheets

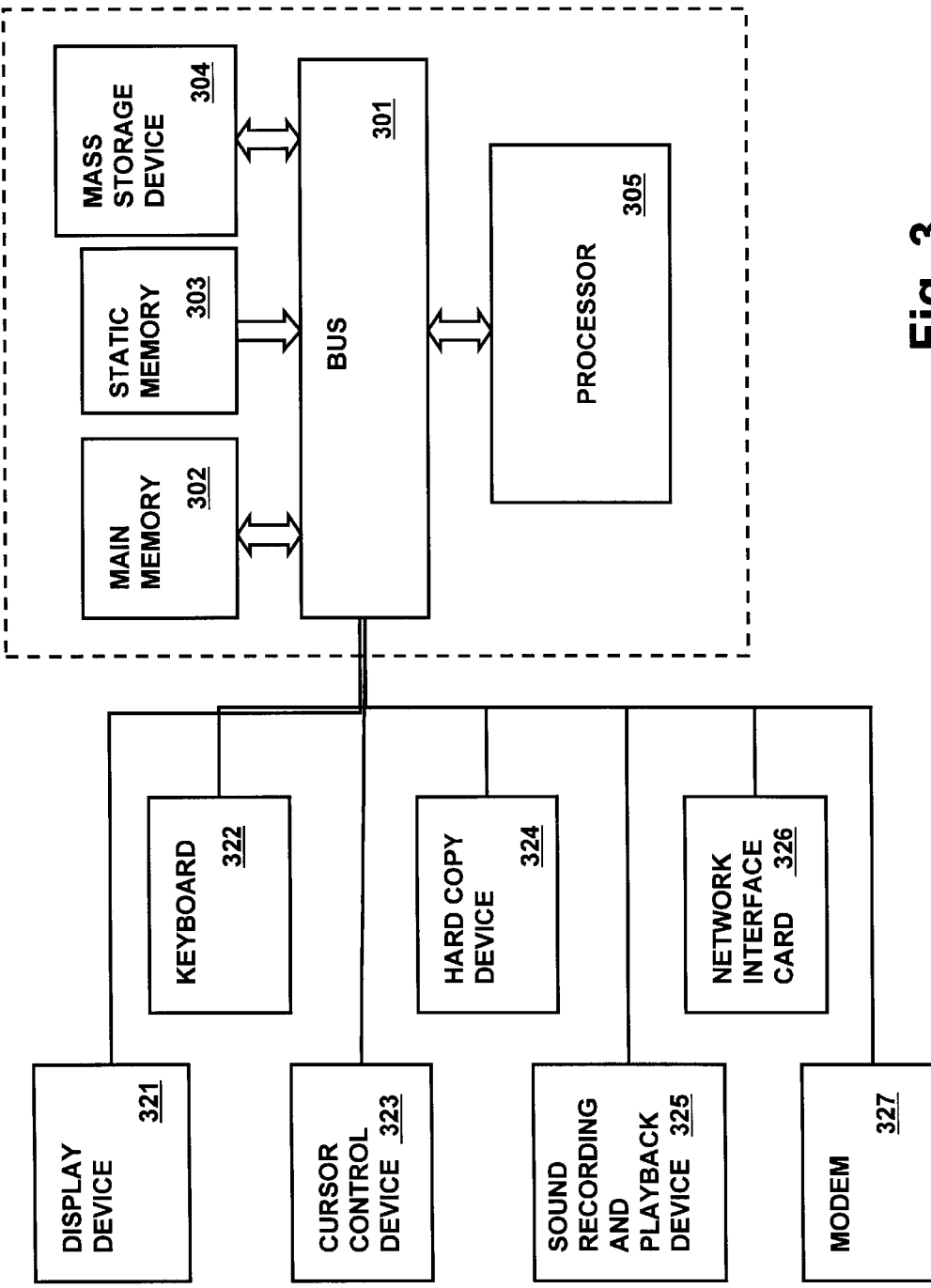

METHOD AND APPARATUS FOR COMMUNICATING CABLE MODEM PROBLEM DEMARCATION THROUGH A GRAPHICAL USER INTERFACE

BACKGROUND OF THE INVENTION

1. Field of the Invention

The present invention relates generally to cable modems. In particular, the present invention relates to improving diagnostics for cable modem problem demarcation using a graphical user interface.

2. Background Information

The use of cable modems has increased significantly over the last few years due to the demand for larger bandwidth and faster connection to the Internet. A common problem with using cable modems is that users may experience loss of service due to incorrect installation or configuration, problems with the hardware or software, or problems with the cable network.

When service loss occurs, it is desirable to restore it as quickly, and cheaply, as possible. Therefore, the user or service technician needs to locate the cause of the problem as quickly and cheaply as possible. Locating the cause of the problem is referred to as demarcation. Effective demarcation requires distinguishing which major functional area, i.e. software, hardware, or cable network, is causing the problem, and further identifying the nature of the problem within the major functional area.

The increased use of host-migrated, or customer premises equipment (CPE)-controlled cable modems (CCCMs) has introduced new uncertainties into the cable modem usage model. The CPE may include a variety of personal computers (PCs), workstations, network computers, and other electronic equipment. These uncertainties have resulted in even higher customer support burdens for cable modem equipment vendors, manufacturers, and cable operators. In an effort to address these and other problems in the use of CCCMs, Cable Television Laboratories, Inc., also known as CableLabs®, a non-profit research and development consortium of cable television system operators representing North and South America, has set forth an interim specification entitled *Cable Modem to CPE Interface (CMCI) Specification*, SP-CMCI-I05-001215, rev'd Dec. 15, 2000, as part of the *Data Over Cable Service Interface Specifications* (DOCSIS). Among other things, the CMCI specification defines the CCCM diagnostic capabilities that are required to help avoid or shorten support calls to vendors and cable operators or multiple service operators (MSOs). The required CCCM diagnostic capabilities include validation and testing of both hardware and software, initialization and run-time diagnostics, and various diagnostic reporting requirements, including a list of CCCM error codes.

Diagnostic tools to demarcate cable modem problems are known in the art. For example, a number of equipment vendors have long provided a craftport tool to debug cable modems. Craftport tools are typically provided in the form of text-based terminals that are capable of configuring, monitoring, and controlling the installation and operation of the cable modem. Designed for technicians, the craftport tools require significant technical expertise that makes them unsuitable for use by a typical home user. More recently, cable operators, or MSOs, and cable modem equipment vendors have provided higher-level web-based diagnostic interfaces to cable modems; however, these interfaces are generally non-interactive viewer-type applications which are not as thorough or as automatic in displaying demarcation and repair information as is needed to be of assistance to the typical home user.

Thus, a drawback to the prior art diagnostic tools to demarcate cable modem problems is that they are typically passive, one-way, non-interactive approaches to diagnosing problems with cable modems. Those diagnostic tools that offer a more interactive approach are often difficult to use as they are designed for technicians having a high-level of expertise. Oftentimes, the diagnostic tool interfaces are cumbersome text-based and menu-driven interfaces that are not user-friendly. Therefore, the prior art diagnostic tools for cable modems provide little support for a typical home user.

Current methods of demarcation typically involve remote diagnosis, i.e. from the cable modem head-end. But remote diagnosis is fully effective only for conventional, or stand-alone, modems which operate autonomously from any other equipment, and is considered insufficient for a host-migrated cable modem, or CCCM. Moreover, prior art diagnostic tools for demarcating cable modem problems cannot provide the CCCM diagnostic capabilities required by the CMCI as they are not designed to take advantage of the CPE resources to assist the user in resolving the problem themselves. What is needed, therefore, is an improved way of providing diagnostic capabilities for CCCM problem demarcation, as this would reduce the number of user support calls and service calls to demarcate and correct problems.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates a block diagram of a general-purpose computer system upon which an embodiment of the present invention may be implemented;

DETAILED DESCRIPTION OF THE INVENTION

Figure 1:
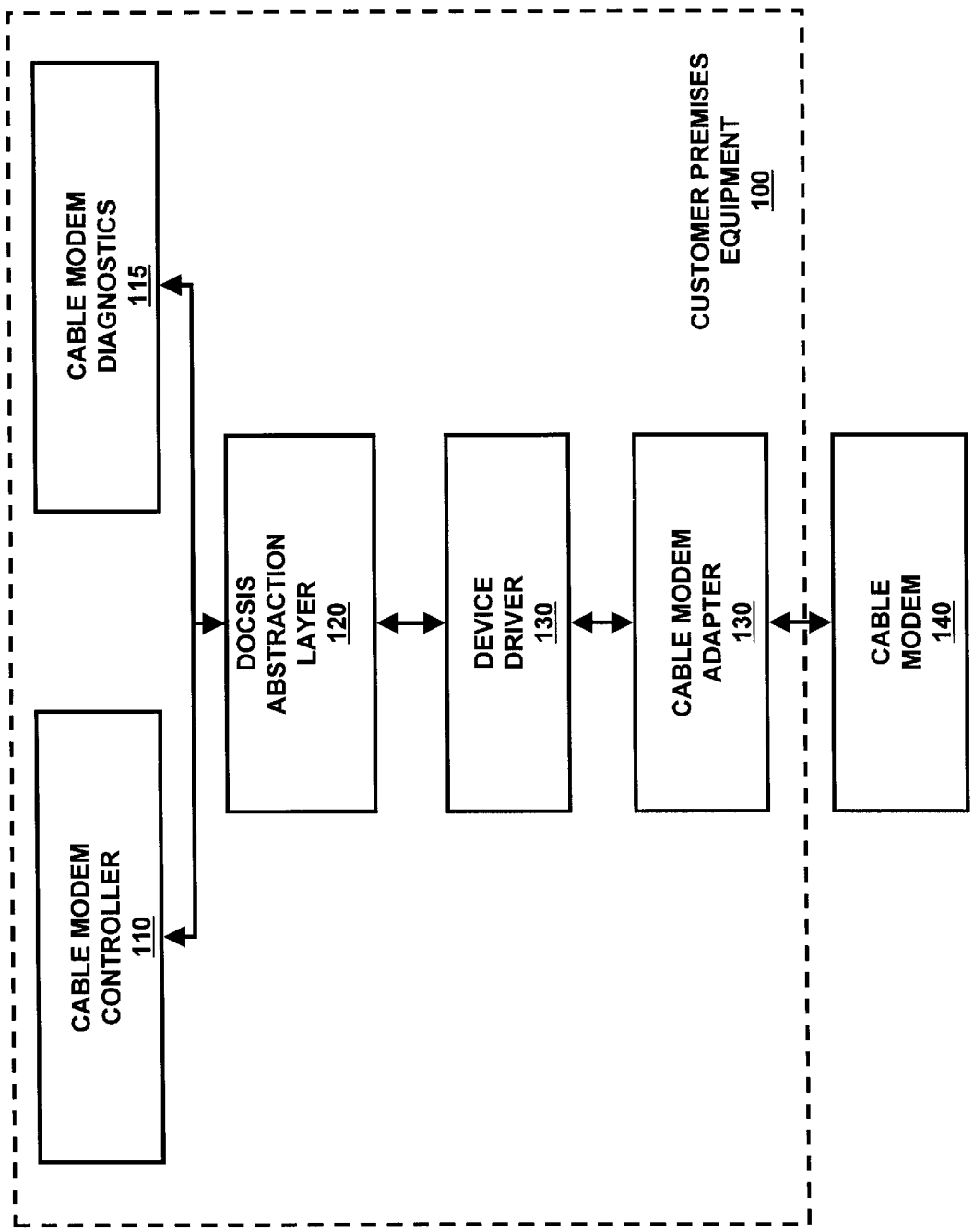
FIG. 1 illustrates a block diagram overview of the operating environment of the present invention in accordance with one embodiment.

In the following description various aspects of the present invention, a method and apparatus for communicating cable modem problem demarcation through a graphical user interface, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system or cable modem, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A CPE-controlled cable modem (CCCM) must be made to operate as robustly and reliably as a conventional cable modem, to avoid an increased technical support burden for MSOs and cable modem equipment vendors. In the method of the present invention, a cable modem diagnostics application is provided for the cable modem end-user to detect and fix most common problems without resorting to technical support or service calls.

Specifically, the cable modem diagnostics application reduces the technical support burden by automatically demarcating problems with the CPE-software, CPE-hardware, or cable network. The cable modem diagnostics application helps the end-user to self-diagnose and self-repair most common problems, and guides the end-user in escalating more serious problems to (and only to) the correct provider of technical support. Although less frequently, the diagnostics application also assists technical support personnel in diagnosing and resolving common cable modem operation problems In one embodiment, the cable modem diagnostics application is a stand-alone or user software that runs separately from, but can work in conjunction with, the cable modem installation software, as well as the cable modem startup, or run-time software. The diagnostics application may be implemented as an independent, stand-alone graphical user interface (GUI) user application operating in conjunction with a GUI operating system such as Microsoft Windows.

With reference to FIG. 1, a block diagram overview of the operating environment of the present invention is illustrated in accordance with one embodiment. As shown, a cable modem diagnostics application 115 is operable on customer premises equipment 100 along with a cable modem controller application 110. The cable modem controller application 110 provides the necessary installation and run-time functionality to install, monitor, and configure a CPE-controlled cable modem (CCCM) 140. The cable modem diagnostics application 115 provides a user-friendly, self-explanatory diagnostics information and tools for the average end-user to run.

In one embodiment, the cable modem diagnostics application 115 and cable modem controller application 110 communicate with the DOCSIS abstraction layer (DAL) 120, which is a translation library that provides one of the interfaces to the necessary device drivers 130. The DAL 120 provides the DOCSIS-level abstraction, through DAL functions such as SetFrequency ( ), SetPower ( ), etc. In one embodiment, the DAL translates C++-style function calls from the cable modem diagnostics application 115 and cable modem controller application 110 into ioctl-style calls to the device drivers 130, and performs parameter checking for the calls.

The cable modem 140 may be any modem capable of being controlled by the CPE 100, including cable modems controlled by a personal computer (PC), workstation, network computer, or other electronic equipment. The cable modem 140 may also be located internally or externally to the CPE 100.

Figure 2:
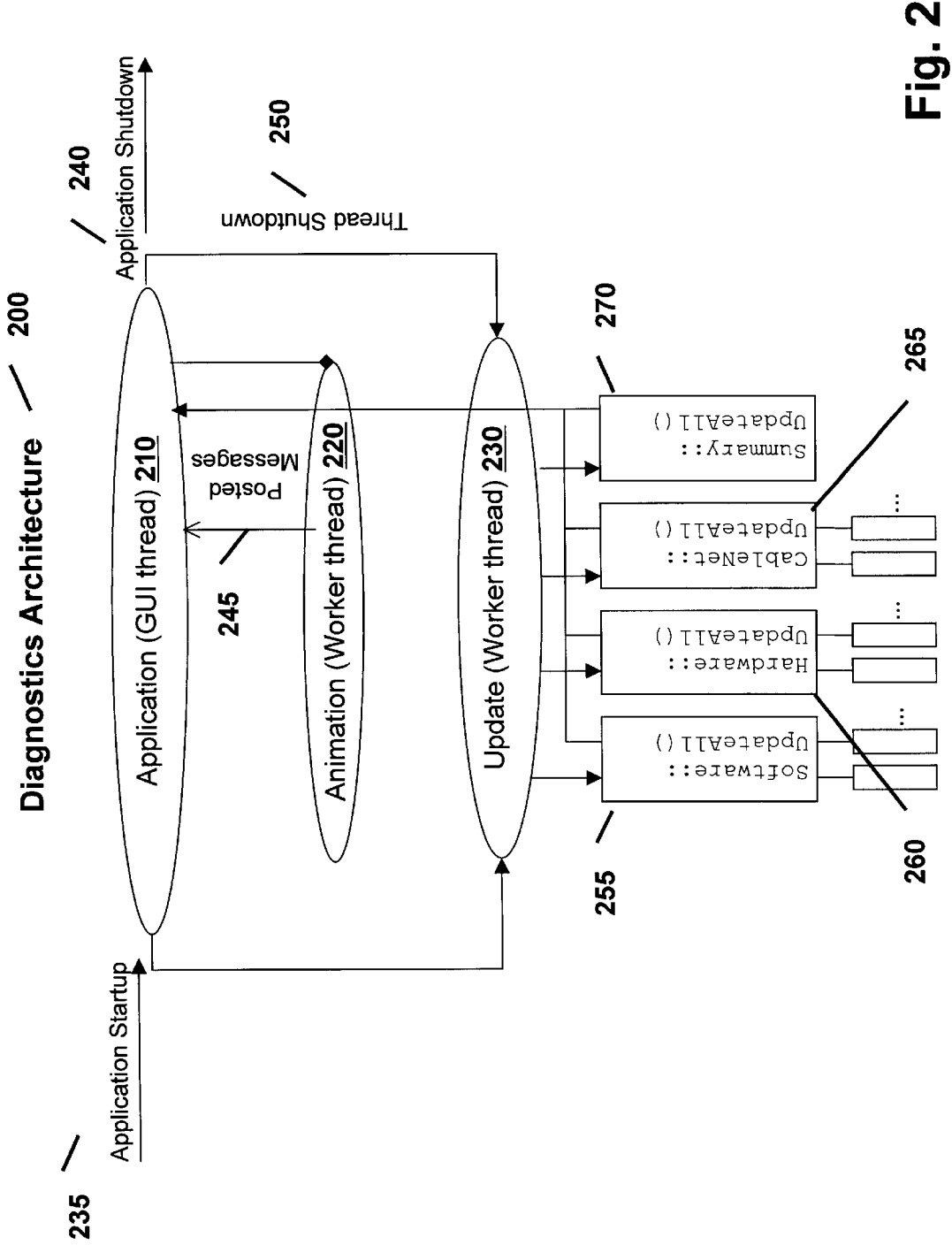
FIG. 2 illustrates a block diagram overview of a diagnostics architecture of the cable modem diagnostics application of FIG. 1 in accordance with one embodiment.

With reference to FIG. 2, a block diagram overview of a diagnostics architecture 200 of the cable modem diagnostics application 115 of FIG. 1 is illustrated in accordance with one embodiment of the present invention. In the illustrated embodiment, the diagnostics architecture uses a threading model, and provides three threads of execution. The first thread is the application GUI thread 210, which starts the application 235 and creates the necessary property sheets and pages to display the cable modem diagnostics information. The application GUI thread 210 also communications with the worker threads 220 and 230, receiving posted messages 245 and the results of DAL function calls 255, 260, 265, and 270. The application GUI thread also controls the application shutdown 240 and thread shutdown 250. The worker threads include an animation thread 220 which controls the display of animated icons on the property pages, and an update thread 230 which continually updates the statuses on the property pages by issuing the appropriate function calls to the DAL 120. The statuses include each of the tabs and buttons that depict the diagnostics information.

Referring now to FIG. 3, wherein a block diagram of a general-purpose computer system upon which an embodiment of the present invention may be implemented is shown. As illustrated, general-purpose computer system 300 is one type of customer premises equipment 100 that comprises a bus 301, or other communications hardware and software, for communicating information, and a processor 302 coupled with bus 301 for processing information. Computer system 300 further comprises a random access memory (RAM) or other dynamic storage device 302 (referred to as main memory), coupled to bus 301 for storing information and instructions to be executed by processor 302. Computer system 300 also comprises a read only memory (ROM) 303, and/or other static storage device, coupled to bus 301 for storing static information and instructions for processor 302. Mass storage device 304 is coupled to bus 301 for storing information and instructions.

Furthermore, mass storage device 304, such as a magnetic disk or optical disk, and its corresponding disk drive, can be coupled to computer system 300. Computer system 300 can also be coupled via bus 301 to a display device 321 for displaying information to a computer user such as a network manager. Display device 321 is used to display windows containing a graphical user interface (GUI) to the diagnostics information generated by the cable modem diagnostics application 115. Display device 321 can include a frame buffer, specialized graphics rendering devices, a cathode ray tube (CRT), and/or flat pane display. An alphanumeric input device 322, including alphanumeric and other keys, is typically coupled to bus 301 for communicating information and command selections to processor 305. Another type of user input device is cursor control device 323, such as a mouse, a trackball, a pen, a touch screen, or cursor direction keys for communicating direction information and command selections to processor 305, and for controlling cursor movement on display device 321. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom.

Another device that may be coupled to bus 301 is a hard copy device 324 which may be used for printing instructions, data, or other information on a medium such as paper, film, or similar types of media. Additionally, computer system 300 can be coupled to a device for sound recording, and/or playback 325, such as an audio digitizer coupled to a microphone for recording information. Further, the device may include a speaker that is coupled to a digital to analog (D/A) converter for playing back the digitized sounds.

Network interface card 326 is coupled to bus 301. Network interface card 326 is further coupled to an external computer network (not shown). Network interface card 326, in conjunction with appropriate data communications protocols (e.g., the TCP/IP suite of internetworking protocols), provide the means by which cable modem diagnostics application 115 operating on a general-purpose computer system 300 exchanges information with other devices coupled to the same computer network. Modem 327 is coupled to bus 301, and provides an alternate means of exchanging information with other devices for which a modem connection to an external computer network or device (not shown) can be established.

Computer system 300 and cable modem diagnostics application software stored and executed therein as part of the method and apparatus operate in conjunction with an operating system with graphics capability, such as Microsoft's Windows operating system. Commercially available computer systems implementing the features of general-purpose computer system 300 include a broad range of operating system-based computers, including server computers, desktop computers, workstations, devices, or appliances. In some cases, the present invention may be used in conjunction with various browser (e.g. Microsoft Internet Explorer or Netscape Navigator) to yield an operational platform upon which an embodiment of the present invention may be implemented.

The cable modem diagnostics application 115 may be initiated by the end-user in a variety of ways. For example, in one embodiment, the end-user may initiate the cable modem diagnostics application 115 at any time from the a popup menu displayed by the cable modem controller application 110, or from a shortcut icon representing the cable modem diagnostics application 115 and installed on the Windows desktop. In addition, the end-user may initiate the cable modem diagnostics application 115 from a user tutorial provided with the cable modem controller application 110. Lastly, the cable modem diagnostics application 115 may be initiated by the end-user from the cable modem controller application 110 in response to a fatal-error dialog box, in which case the cable modem controller application 110 passes its error-code to the cable modem diagnostics application 115 for display in the appropriate diagnostic information page.

Figure 4A:
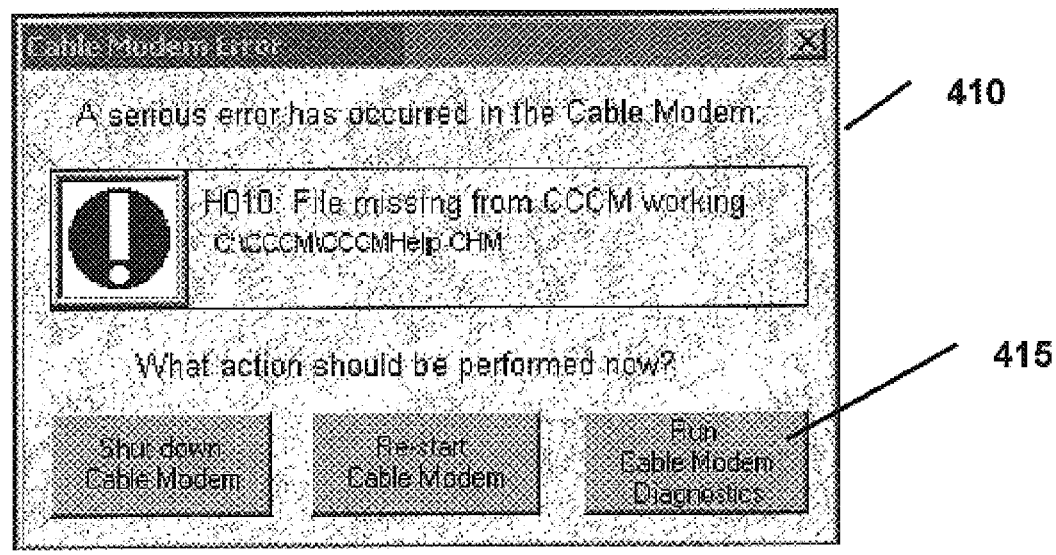
FIGS. 4a and 4b illustrate a fatal-error dialog box and accompanying run-time error log from which the cable modem diagnostics application may be initiated in accordance with one embodiment.
Figure 4B:
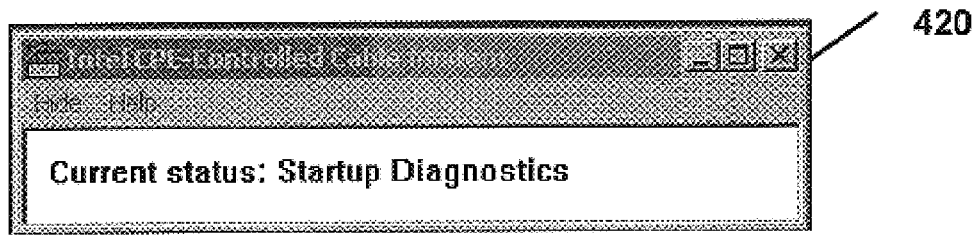

Referring now to FIGS. 4a and 4b, wherein an illustration of a fatal-error dialog box 410 and accompanying run-time error log 420 from which the cable modem diagnostics application 115 may be initiated in accordance with an embodiment of the present invention is shown. The illustrated fatal-error dialog box 410 and accompanying run-time error log 420 are generated by the cable modem controller application 110. As shown, a command button 415 or other graphical visual icon is provided for affirmatively entering a command to initiate the execution of the cable modem diagnostics application 115.

In one embodiment, the cable modem diagnostics application 115 is comprised of a property sheet, with one property page (and accompanying tab) dedicated to each of the following functional categories:

| | |
|---|---|
| Software | (Customer Premise Equipment) |
| Hardware | (Customer Premise Equipment) |
| Cable Network | (Cable Operator Equipment) |
| Summary | |
| Help | |

The property pages provide a quick, clear indication of problem demarcation, and presents information hierarchically, to simplify user interaction as often as possible. In addition, throughout each of the property pages, hierarchical presentation of information puts simpler information where it is visible to the user with little or no user effort (i.e. no mouse-clicks), and places (or hides) more detailed information where it requires more work to access (one or two mouse-clicks). The hierarchy of presentation (from highest to lowest) is summarized in Table 1.

TABLE 1

Hierarchical Presentation

| Level | Location | Mouse-clicks to access info | Information Type | Fix Level |
|---|---|---|---|---|
| Highest | Property Sheet Tabs | 0 | Symbolic demarcation | N/A |
| | Summary Page | 0 | Textual demarcation | All |
| | Category Pages | 1 | Components | Single |
| Lowest | Command Buttons | 2 | Details of problem | Single |

As can be seen from Table 1, for a given problem (or when run as a general check without any problem), the end-user may not have to delve any deeper than the highest level(s).

In one embodiment, quick, clear demarcation is accomplished by displaying a status icon in each of the property page tabs (except Help), to signal the overall status of each functional category at all times. The demarcation display statuses may be depicted using an icon or color or both as summarized in Table 2. It should be noted that different colors, icons, or other graphical visual elements, or even sounds may be used to indicate any given status without departing from the scope of the invention.

TABLE 2

| | Demarcation Display | |
|---|---|---|
| Status | Color/Icon | Meaning |
| OK | green ✓ | functional area has no problem |
| Unknown | yellow ? | functional area's status is unknown |
| Broken | red X | functional area has at least one problem |

In one embodiment, in addition to the tabbed display, the Summary property page shows a similar tab color/icon to show the overall status. The overall status is a logical combination of individual functional areas statuses and is derived as follows:

```
If any functional area is 'broken' then overall
    status is 'broken'
        Else If any functional area is 'unknown' then
            overall status is 'unknown'
        Else (all functional areas are 'ok')
            overall status is 'ok'
```

Figure 5A:
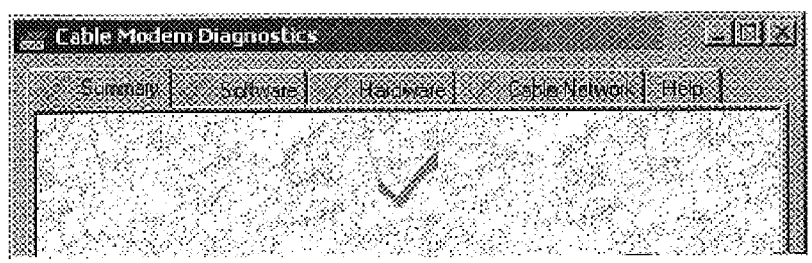
FIGS. 5a and 5b illustrate examples of the cable modem diagnostics application property page tabs in accordance with one embodiment.
Figure 5B:
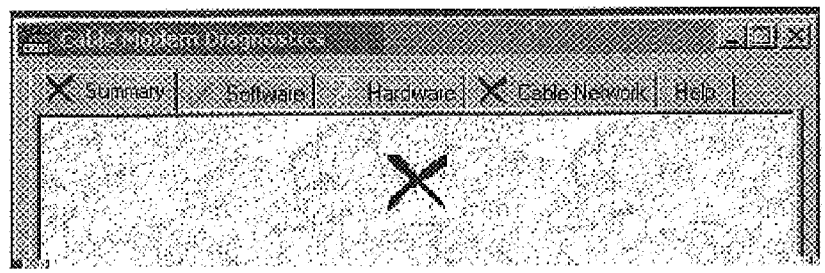

The above-described demarcation display shows an instant, clear demarcation indication, with no user effort required (i.e. no mouse clicks). This technique is further illustrated by the examples in FIGS. 5a–5b. In FIG. 5a, the cable modem diagnostics application 115 property page tabs illustrate the case in which all of the statuses are OK. In FIG. 5b, the cable modem diagnostics application 115 property page tabs illustrate the case in which the Cable Network status is broken, but the other statuses are OK, resulting in a Summary status of broken, or not OK.

Figure 6:
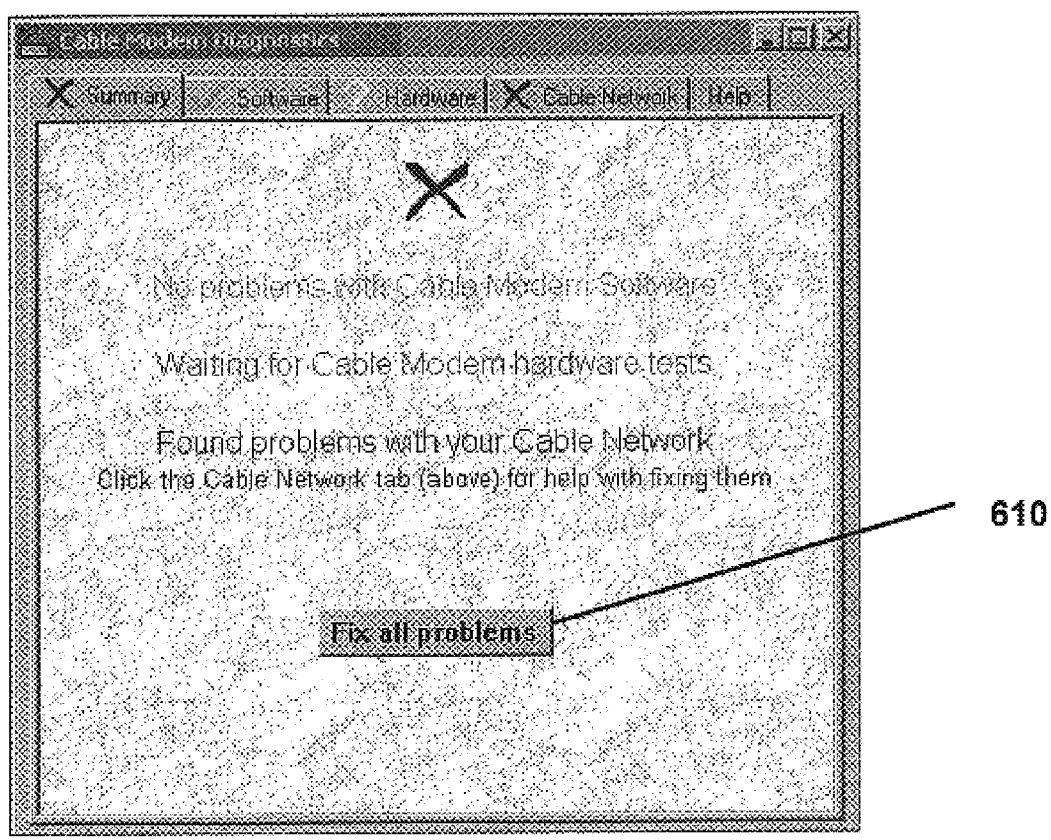
FIG. 6 illustrates a Summary property page of the cable modem diagnostics application in accordance with one embodiment.

Referring now to FIG. 6, wherein an illustration of the Summary property page is shown in further detail in accordance with an embodiment of the present invention. The Summary property page is typically designated as the initial property page displayed at the time of the cable modem diagnostics application 115 startup, although other property pages may be used as the default. As shown, the demarcation information is re-stated and summarized on the body of the Summary property page, e.g. "Found problems with your Cable Network. Click the Cable Network tab (above) for help with fixing them."

FIGS. 6, 7, 8, 9, and 11 illustrate an embodiment of each of the major function categories of property pages, Summary, CPE-Software, CPE-hardware, Cable Network, and Help, respectively. In one embodiment, the application GUI thread 210 instantiates one of each of the property page objects for the major function categories (including the Summary and Help pages), and joins them to the property sheet object, to form the cable modem diagnostics application 115. In addition to the property pages, the cable modem diagnostics application 115 generates dynamic dialogs in the form of dialog objects that are created and destroyed (i.e. displayed and removed) as needed while the application runs.

Each of the major function pages, CPE-Software, CPE-Hardware, and Cable Network, displays an overall representative icon, as well as a combination of detailed status buttons, fix buttons, and information buttons as appropriate. All statuses shown on the property page tabs and buttons are continually updated for a live, real-time display.

Detailed-status buttons apply to particular components within the functional categories. They serve two purposes. The first purpose is to display the component's status. In one embodiment this is achieved by an icon, or color, or other graphical element (e.g. the green ✓, yellow ? or red X) overlaid onto the button. The second purpose is to provide detailed information about the status when clicked. In one embodiment, when a detailed status button is pressed, it creates a dynamic dialog Status Details, which contains text describing the current status pertaining to the particular component, as well as an icon and sound corresponding to the status.

Figure 7:
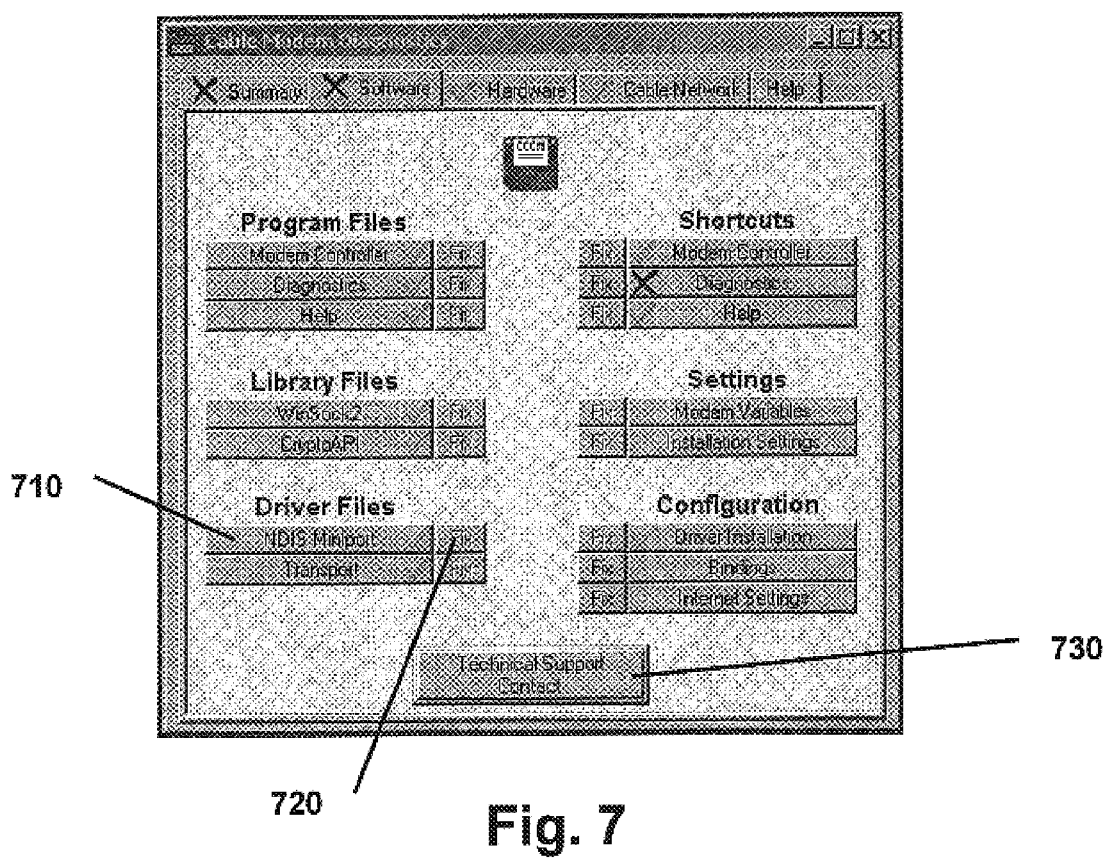
FIG. 7 illustrates a Software property page of the cable modem diagnostics application in accordance with one embodiment.

For example, with reference to FIG. 7, the Network Driver Interface Specification (NDIS) Miniport detailed-status button 710 on the Software property page refers to the NDIS Driver file component within the Software functional category. Clicking on the NDIS Miniport detailed-status button 710 shows an icon, plays a sound and displays a message corresponding to the current status of the NDIS driver file.

Figure 9:
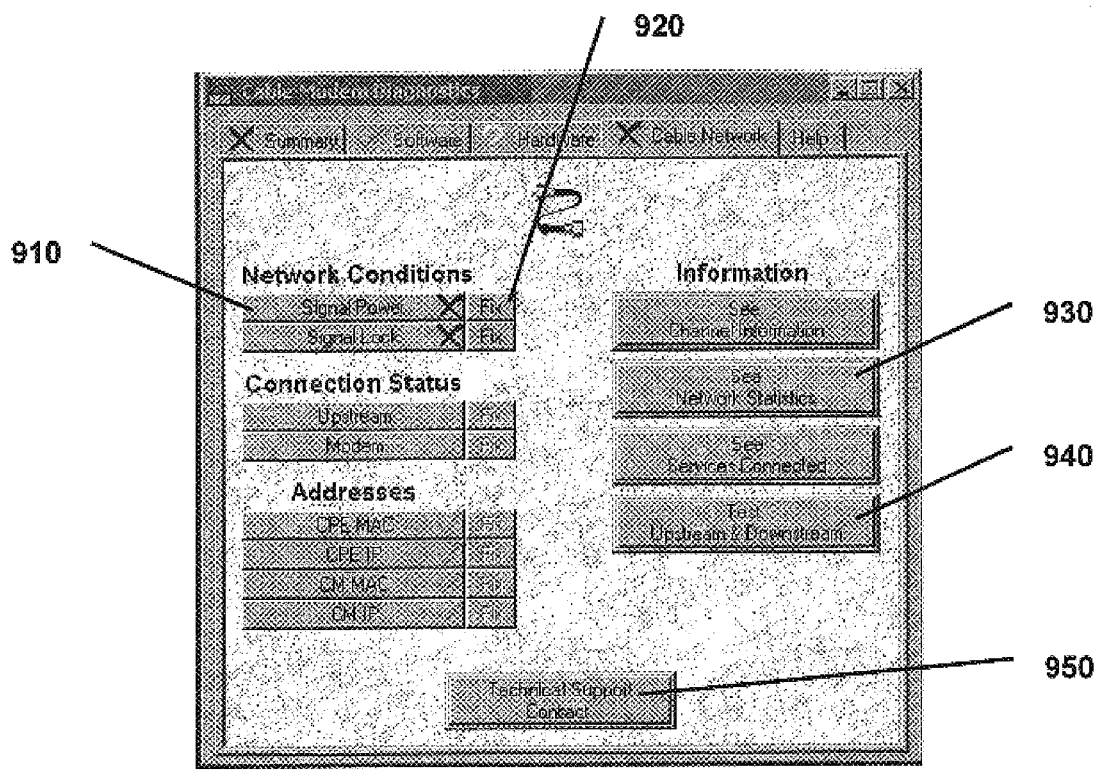
FIG. 9 illustrates a Cable Network property page of the cable modem diagnostics application in accordance with one embodiment.

As another example, with reference to FIG. 9, the Signal Power detailed-status button 910 on the Cable Network property page refers to the cable modem's signal strength, within the Network Conditions sub-category of the Cable Network functional category. As is shown, the Signal Strength component status is broken as indicated by the graphical element X displayed in the color red. Clicking on the Signal Power detailed-status button 910 generates the dynamic Signal Strength dialog 1010, illustrated in FIG. 10. As shown, the Signal Strength dialog 1010 plays a sound, displays a text message, icon and a bar-graph corresponding to the current signal strength (shown as weak) and signal power ranges as specified in the RFI. In the illustrated embodiment, the Signal Strength dialog 1010 uses a GetDSPower ( ) DAL function via the DAL 120 to obtain the signal strength in decibels referenced to 1 millivolt (dBmV).

Figure 8:
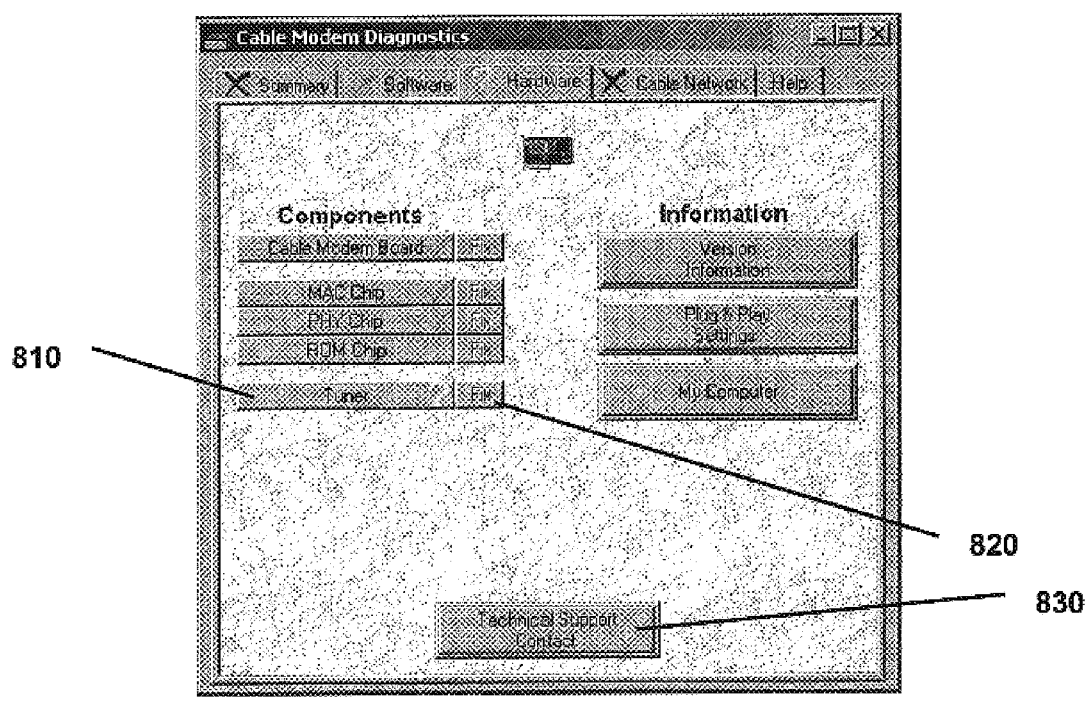
FIG. 8 illustrates a Hardware property page of the cable modem diagnostics application in accordance with one embodiment.

With reference to the major functional category property pages illustrated in FIGS. 7, 8, and 9, each detailed-status button has a corresponding fix button adjacent to it, 720, 820, and 920. Each fix button is disabled 720 (i.e. grayed out) when its corresponding status button is OK (shows a green ✓, i.e. there is nothing to fix); otherwise the fix button is enabled when there is a question 820 (shows a yellow ?, i.e. status is unknown), or when the component is not OK 920 (shows a red X, i.e. status is broken). Pressing an enabled fix button executes a fix action, such as copying a file, or showing a picture.

Figure 11:
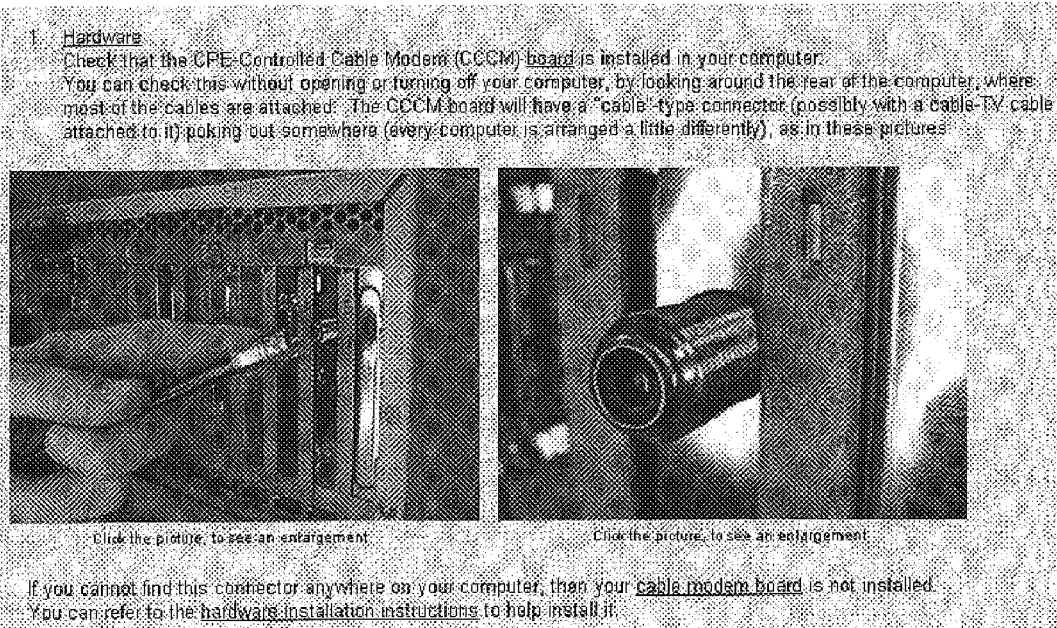
FIG. 11 illustrates an example of linked instructional images and text provided by the cable modem diagnostics application in accordance with one embodiment.

For example, with reference to FIG. 9, when the enabled Signal Power fix button 920 on the Cable Network property page is activated, the cable modem diagnostics application 115 provides a logical link to a set of instructional images (e.g. a hyper-text markup language (HTML) help file). Referring now to FIG. 11, wherein an example of linked instructional images and text provided by the cable modem diagnostics application is illustrated in accordance with one embodiment. As shown, an HTML help file instructing the end-user how to check that the CCCM board is properly installed on the end-user's computer is displayed in response to the end-user's activation of the fix button 920. By following the text instructions and accompanying photographic illustration, the end-user can attempt to correct the cable modem problem themselves.

Referring again to FIG. 6, in addition to the individual component fix buttons 720, 820, and 920, a fix all button 610 or other graphical visual icon is provided on the Summary page (or other initial default property page) for affirmatively entering a command to the cable modem diagnostics application 115 to perform the function calls necessary to automatically fix all of the demarcated problems if possible. The fix all button 610 is enabled when problems have been demarcated or disabled when there are no problems as appropriate. If enabled, clicking on the button causes the cable modem diagnostics application 115 to perform the following logic:

```
For each functional area (CPE-Software, CPE-Hardware,
   CableNetwork)
      For each component
         If status is 'broken' then
            If Diagnostics can automatically fix
            component, execute its Fix function
         Else
            Report that Diagnostics could not
            automatically fix the component
```

Information buttons present auxiliary information (such as bitrate, computer settings, etc.) which does not directly figure into the demarcation (OK/NotOK) decision. Unlike the detailed status buttons, they do not have a status icon overlaid onto them, nor do they have a corresponding fix button associated with them. Their purpose is to provide a logical link to a set of informational images (e.g. a hypertext markup language (HTML) informational file). An example of an informational button is illustrated in FIG. 9 on the Cable Network property page. The See Network Statistics 930 information button, when activated by the end-user, will display information relating the current network statistics. In some cases the informational buttons will also perform an action, such as is shown in the Test Upstream & Downstream 940 information button which, when activated by the end-user, will perform upstream and downstream tests on the cable network and display the results of the test.

Figure 12:
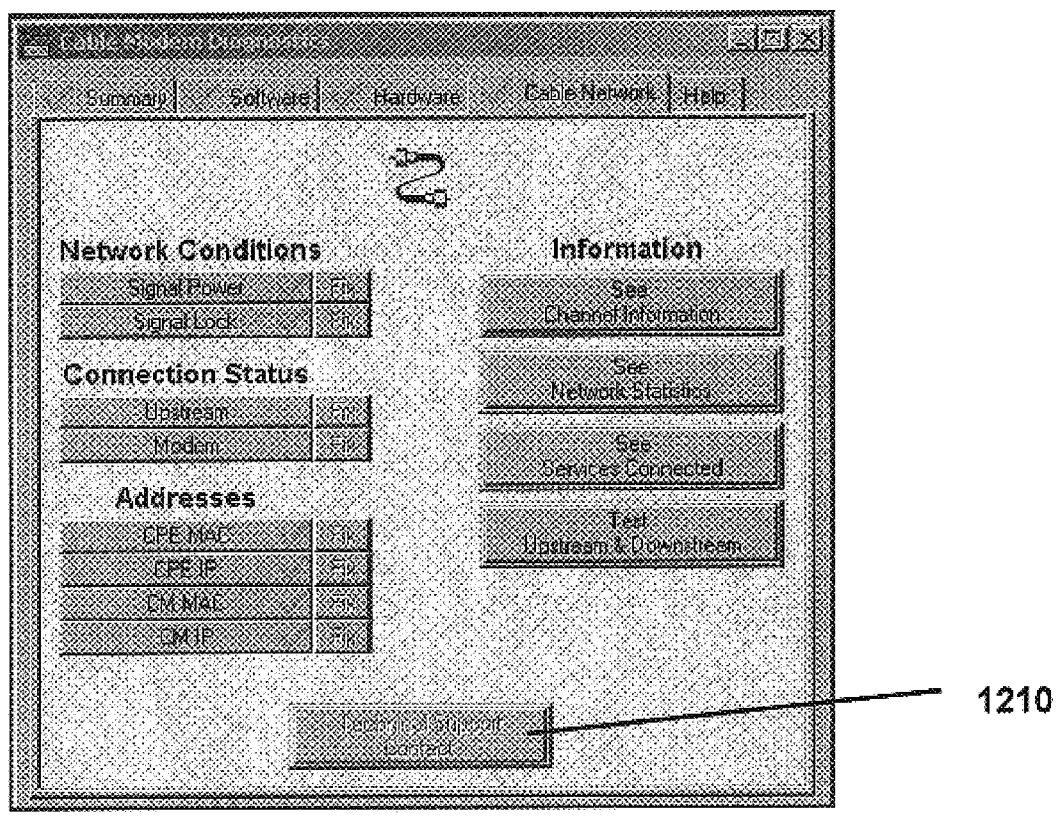
FIG. 12 illustrates a Cable Network property page of FIG. 9 after the user has corrected the Signal Power and Signal Lock network conditions with the corresponding Fix buttons in accordance with one embodiment.
Figure 13:
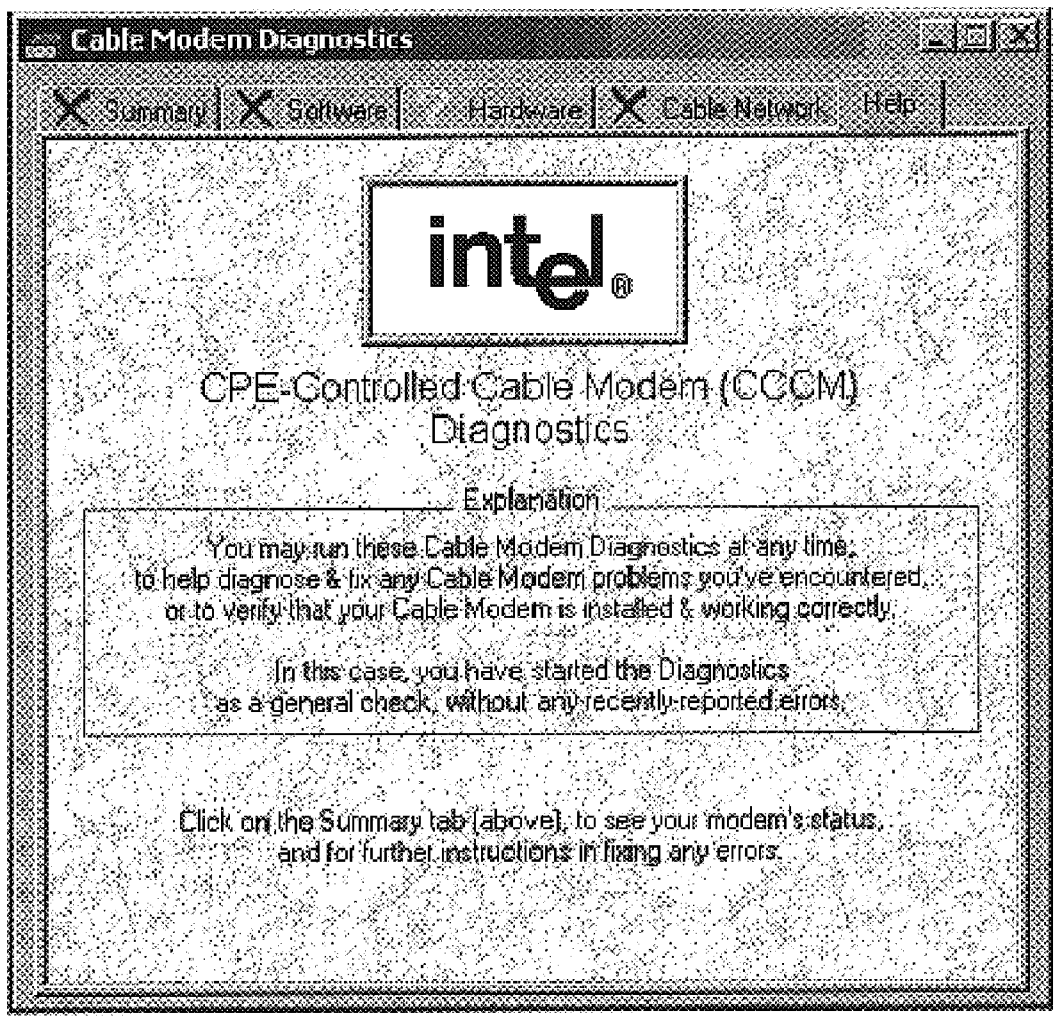
FIG. 13 illustrates the Help property page of the cable modem diagnostics application in accordance with one embodiment.

In addition to cable modem problem demarcation, the cable modem diagnostics application 115 provides the end-user with technical support guidance that directs the user to contact the appropriate (and only the appropriate) technical support personnel in cases where the end-user cannot fix the problem himself. With reference to FIGS. 7, 8, and 9, a Technical Support Contact button 730, 830, and 940 is provided on each of the three major functional category property pages, CPE-Software, CPE-hardware, and Cable Network, respectively. The Technical Support Contact button 730, 830, and 940, when activated by the end-user, will display technical support information relating only to the major functional category property page, CPE-Software, CPE-hardware, or Cable Network, on which it appears. This allows for the display of a unique and independent end-user support setup for each different major functional category. Thus the equipment vendor support information might be activated only from the CPE-hardware page, while the cable service provider support information might be activated only from the Cable Network page, and further, may be activated only when there have been actual problems demarcated relating to those areas. In addition, in one embodiment, the Technical Support Contact button 730, 830, and 940, will only be enabled (both functionally and visually, i.e. clickable and not grayed out) after the end-user has attempted to fix the problem themselves, by using the problem demarcation detailed status and fix buttons related to the current cable modem problem. In this way, the calls to technical support personnel are minimized. Moreover, should technical support be necessary, the end-user is directed to the correct technical support contact information and prevented from accessing incorrect information. An example of an enabled Technical Support Button 950 on the Cable Network property page is illustrated in FIG. 9; a corresponding disabled Technical Support Button 1210 on the Cable Network property page is illustrated in FIG. 12.

Software Property Page

The functions of the detailed status buttons and corresponding fix buttons for one embodiment of the CPE-Software property page illustrated in FIG. 7 will now be described in further detail. The functions of the CPE-Software property page are to check various elements of the CCCM software requirements. This generally involves checking that correct files exist in correct locations, and that various software components are installed and configured correctly. File correctness is determined by performing cyclic redundancy checks (CRC). File CRCs are hard-coded into the cable modem diagnostics application 115. When any change to software occurs (such as a new software upgrade), the cable modem diagnostics application 115 must also be changed to reflect the new CRC.

Program Files Group

Modem Controller—This detailed status button checks that the cable modem controller application 110 file is present in the correct directory and has the correct CRC. The fix button (if enabled), copies the backup copy of file from the fixed backup directory to the correct directory, overwriting if necessary.

Diagnostics—This detailed status button checks cable modem diagnostics application 115 file is present in the correct directory and has the correct CRC (i.e. is not hacked or corrupted). The fix button (if enabled), copies the backup copy of the file from the fixed backup directory to the correct directory, overwriting if necessary (and if possible, since the diagnostics file cannot over-copy itself while running).

Help—This detailed status button checks that the User Tutorial (CCCM Help) file is present, in the correct directory and has the correct CRC. The fix button (if enabled), copies the backup copy of the file from the fixed backup directory to the correct directory, overwriting if necessary.

Library Files Group

This library files group refers to windows Dynamic Link Library (DLL) files. It is problematic to fully (i.e. CRC) check for DLL corruption, because DLLs can legitimately be changed from time to time. Therefore, the cable modem diagnostics application 115 makes simple checks of DLLs by connecting (or attempting to connect) to their function entry points. In general, the buttons check for existence, intactness, and version (must be sufficiently recent).

Winsock2—This detailed status button checks the Winsock2 DLL file. The fix button (if enabled), copies the backup copy of the DLL file from the fixed backup directory to the proper directory, overwriting if necessary.

CryptoAPI—This detailed status button checks the Microsoft CryptoAPI file currently used for Baseline Privacy (BPI). The fix button (if enabled), copies the backup copy of the DLL file from the fixed backup directory to the proper directory, overwriting if necessary.

Driver Files Group

NDIS Miniport—This detailed status button checks that the NDIS Miniport driver file (is present in the correct directory and is correct. The fix button (if enabled), copies the backup copy the file from the fixed backup directory to the proper Windows directory, overwriting if necessary. A reboot is usually necessary for a newly copied driver file to go into effect.

Transport/Intermediate—This detailed status button checks that the intermediate layer driver file is present and in the correct directory, and is correct. The fix button (if enabled), copies the backup copy of the file from the fixed backup directory to the proper Windows directory, overwriting if necessary. A reboot is usually necessary for a newly copied driver file to go into effect.

Shortcuts Group

Modem Controller—This detailed status button checks that the cable modem controller application 110 shortcut is in the user's Startup directory. The fix button (if enabled), copies the backup copy of the file from the fixed backup directory to the user's Startup directory, overwriting if necessary.

Diagnostics—This detailed status button checks that the cable modem diagnostics application 115 shortcut is in the user's Desktop directory. The fix button (if enabled), copies the backup copy of the file from the fixed backup directory to the user's Desktop directory, overwriting if necessary.

Help—This detailed status button checks that the User Tutorial (HTML Help) shortcut is in the user's Desktop directory. The fix button (if enabled), copies the backup copy of the file from the fixed backup directory to the User/Desktop directory, overwriting if necessary.

Settings Group

Modem Variables—This detailed status button checks any registry entries. The fix button (if enabled), creates and restores entries in the registry.

Installation Settings—This detailed status button checks any installation settings. The fix button (if enabled), creates and restores the installation settings for the various software components.

Configuration Group

Driver Installation—This detailed status button checks that the drivers are actually installed and working (as opposed to the Driver File checks above, which only check for existence of correct file). It does this by (attempting) opening the driver device, and sending ioctls to it. The fix button (if enabled) runs the Windows Network Adapter control panel applet. This would assist the user or technician in finding and solving the problem, such as re-installing the driver.

Bindings—This detailed status button checks that CCCM adapter is bound to correct network protocols: TCP/IP, CCCM_MAC, CCCM_UDP, etc. The fix button (if enabled) runs the Windows Network Adapter control panel applet. This would assist the user or technician in finding and solving the problem.

Internet Settings—This detailed status button verifies that CCCM adapter is selected (not telco modem, etc.) and possibly other internet settings. The fix button (if enabled) runs the Windows Internet control panel applet. This would assist the user or technician in finding and solving the problem.

Hardware Property Page

The functions of the detailed status buttons and corresponding fix buttons for one embodiment of the CPE-Hardware property page illustrated in FIG. 8 will now be described in further detail. The functions of the CPE-Hardware property page are to check various elements of the CCCM hardware components.

Components Group

Cable Modem Board—This detailed status button checks for the presence (and very basic functionality) of the cable modem adapter board, by checking the current Windows Plug & Play entries in the registry. The fix button (if enabled) executes the User Tutorial, and links (context-sensitive) to the page with instructional images and text showing installation steps for a board. This allows the user to learn how to check or install the CCCM board.

MAC Chip—This detailed status button checks for the presence and basic functionality of the MAC chip. It performs the following:

Register write/read—100 random numbers

Upstream data loopback—100 bytes known data (plus headers)

Downstream data loopback—100 bytes known data (plus headers)

DAL function(s) used: GetMacInfo ( ). The Fix button (when enabled) displays a message that the hardware has some un-repairable error and must be replaced, and displays additional technical support information in the form of instructional images or text.

PHY Chip—This detailed status button checks for the presence and basic functionality of the PHY chip. It does a register write/read of 100 random numbers. DAL function(s) used: GetPhyInfo ( ) The Fix button (when enabled) displays a message that the hardware has some un-repairable error and must be replaced, and displays additional technical support information in the form of instructional images or text.

ROM Chip—This detailed status button checks the integrity of the cable modem's non-volatile memory. In one embodiment the check uses a checksum, and possibly performs further checks on the certificate integrity. Information from the certificate will be displayed by the Version Information button (described below). The fix button (when enabled) displays a message that the hardware has some un-repairable error and must be replaced, and displays additional technical support information in the form of instructional images or text.

Tuner—This detailed status button determines (as much as possible) the condition of the tuner. In one embodiment, a functional condition can be inferred if the PHY chip sees signal and lock; otherwise tuner condition is determined to be unknown. The fix button (when enabled) displays a message that it is unable to determine tuner condition.

Information Group

Version Information—This information button reports information from the Electrically Erasable Programmable Read Only Memory (EEPROM) such as:

Manufacturer

Date

Versions (Firmware, board, etc.)

Other information from BPI+ certificate

Plug & Play Settings—This information button runs the Windows Device Manager application, so the end-user (or technician) can see the adapter settings.

My Computer—This information button runs the Windows System Information application, so the user (or technician) can see all aspects of the computer environment, which may affect CCCM, such as:

OS version

Disk space

Memory

Cable Network Property Page

The functions of the detailed status buttons and corresponding fix buttons for one embodiment of the Cable Network property page illustrated in FIG. 9 will now be described in further detail. The functions of the Cable Network property page are to check various elements of the cable modem network connection.

Network Conditions Group

Figure 10:
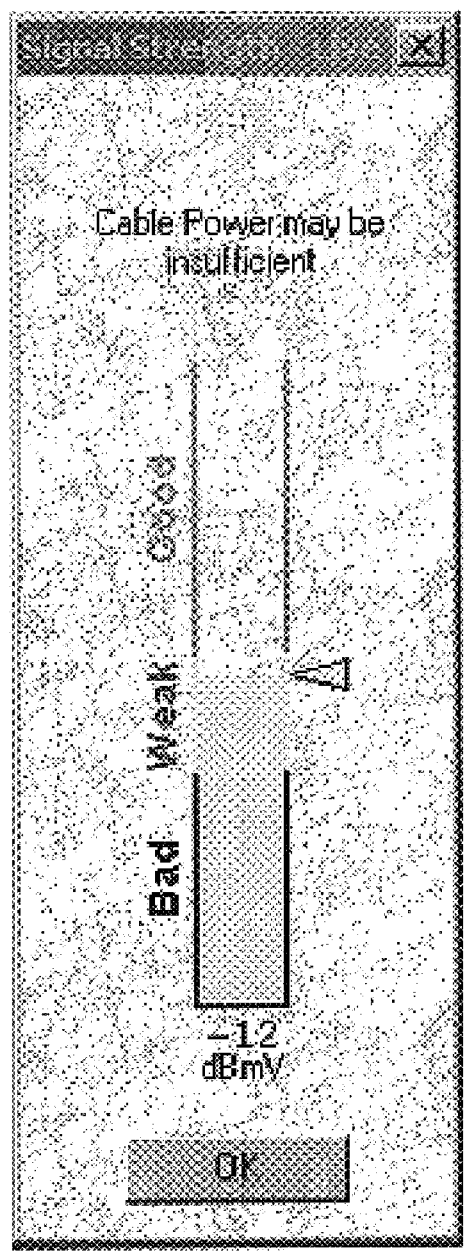
FIG. 10 illustrates a Signal Strength dynamic dialog of the cable modem diagnostics application in accordance with one embodiment.

Signal Power—This detailed status button generates the dynamic Signal Strength dialog 1010, illustrated in FIG. 10, as previously described. DAL function(s) used: GetDSPower ( ). The fix button (if enabled) executes the User Tutorial and provides a logical link to a set of instructional images, an example of which is illustrated in FIG. 11, showing connection steps for a cable and board. This allows the user to learn how to properly connect the modem (a common cause of bad signal).

Signal Lock—This detailed status button checks for downstream signal lock. DAL function(s) used: GetMPEGLock ( ) The fix button (if enabled) executes the User Tutorial and provides a logical link to a set of instructional images, an example of which is illustrated in FIG. 11, showing connection steps for a cable and board. This allows the user to learn how to properly connect the modem (a common cause of bad signal).

Connection Status Group

Upstream—This detailed status button displays cable network information such as range, SID, channel information, and upstream power level.

Modem—This detailed status button displays modem progress/status information, such as microcontroller (MMP) state and cable modem controller application state.

Addresses Group

CPE MAC—This detailed status button checks the cable modem's CPE-side Media Access Controller (MAC) address. Activating the button displays the address.

CPE IP—This detailed status button checks the cable modem's CPE-side Internet Protocol (IP) address. Activating the button displays the address.

CM MAC—This detailed status button checks the cable modem's CM-side MAC address. Activating the button displays the address.

CM IP—This detailed status button checks the cable modem's CM-side IP address. Activating the button displays the address.

Information Group

Channel Information—This information button displays channel information such as upstream connection modes, rates, downstream connection modes, and rates.

Network Statistics—This information button displays network statistic information such as error rates, bit rates, and Transmission Control Protocol (TCP) packet retransmission rates.

Services Connected—This information button displays connected service flows (SIDs), including unicast, multicast, and broadcast. In one embodiment the button provides a logical link to information that interprets for the user the meanings or contents of the various connected services (i.e. voice, videoconference, movies, etc.).

Test Upstream & Downstream—This information button tests end-to-end bi-directional communication, for instance by PINGing and reports the results.

Accordingly, a novel method and apparatus is described for a method and apparatus to communicate cable modem problem demarcation through a graphical user interface. From the foregoing description, those skilled in the art will recognize that many other variations of the present invention are possible. In particular, while the present invention has been described as being implemented in certain components of the customer premises equipment 100 and the cable modem 140, some of the functions performed by the cable modem diagnostics application 115 in application thread 210 and worker threads 220 and 230, may be distributed in other components of a cable modem 140, a cable head-end, or other components of a customer premises equipment 100 to which the cable modem 140 is connected without departing from the method and apparatus of the present invention. It should further be appreciated that the property pages and dynamic dialogs as shown are for descriptive purposes only, and that other variations for accomplishing the described display, entry, selections or commands to the cable modem diagnostic application 115 user interface may be employed without departing from the principles of or exceeding the scope of the present invention. Thus, the present invention is not limited by the details described. Instead, the present invention can be practiced with modifications and alterations within the spirit and scope of the appended claims.

What is claimed is:

1. An apparatus comprising:
   a cable modem;
   a display device;
   an input device; and
   a cable modem diagnostics application having a demarcation display logic and a graphical fix assistance logic, the demarcation logic displaying a hierarchical presentation of a diagnostic information identifying a problem with the cable modem on the display device, and the graphical fix logic directing a user to enter a command with the input device to automatically fix the problem in accordance with the diagnostic information, wherein the hierarchical presentation is displayed in the form of a property page selected from a group containing a summary page and a help page, the summary page containing a summary of an overall status of a plurality of components listed on a software page, a hardware page, and a cable network page, and the help page containing an explanation message and instruction.

2. The apparatus of claim 1, wherein the diagnostic information and the command to automatically fix the problem is communicated between the cable modem and the cable modem diagnostics application via a Data Over Cable Service Interface Specification (DOCSIS) abstraction layer (DAL) translation library.

3. The apparatus of claim 1, wherein the property page comprises a tab, the tab having an overall status indicator that indicates the overall status of the plurality of components listed on the property page, each of the listed components being associated with at least one of a detailed status button, a fix button and an information button.

4. The apparatus of claim 3, wherein the property page is associated with one of a functional area of software, hardware, or cable network, the software page displaying cable modem diagnostic information relating to customer premises equipment (CPE) software, the hardware page displaying cable modem diagnostic information relating to customer premises equipment (CPE) hardware, and the cable network page displaying cable modem diagnostic information relating to a network to which the cable modem is connected.

5. The apparatus of claim 4, wherein the plurality of components listed on the software page are further hierarchically presented in a plurality of software categories, the software categories including program files, library files, driver files, shortcuts, settings, and configurations.

6. The apparatus of claim 4, wherein the plurality of components listed on the hardware page are further hierarchically presented in a plurality of hardware categories, the hardware categories including components and information.

7. The apparatus of claim 4, wherein the plurality of components listed on the cable network page are further hierarchically presented in a plurality of cable network categories, the cable network categories including network conditions, connection status, addresses, and information.

8. The apparatus of claim 4, wherein a technical support contact button is further listed on the property page, the technical support contact button only being enabled when the at least one detailed status button associated with a listed component displays a problem status, and which, when activated, causes the cable diagnostics application to display a technical support contact information in a separate window not otherwise visible, the technical support contact information being restricted to technical support related to the property page's associated functional area.

9. The apparatus of claim 3, wherein the overall status indicator is a color.

10. The apparatus of claim 3, wherein the overall status indicator is an icon.

11. The apparatus of claim 3, wherein the detailed status button contains a detailed status indicator indicating an individual status of the listed component.

12. The apparatus of claim 11, wherein the detailed status indicator is an icon.

13. The apparatus of claim 11, wherein the detailed status indicator is a color.

14. The apparatus of claim 11, wherein the detailed status indicator, when activated, hyperlinks to a dynamic dialog, the dynamic dialog displaying a detailed information about the individual status of the listed component.

15. The apparatus of claim 14, wherein displaying the detailed information comprises at least one of showing an icon, playing a sound, and displaying a message.

16. The apparatus of claim 14, wherein the dynamic dialog is a signal strength dialog, the signal strength dialog displaying detailed information further comprising a bar-graph, the bar-graph depicting a current signal strength and a signal power level.

17. The apparatus of claim 14, wherein the dynamic dialog is displayed in a different window than the hierarchical presentation.

18. The apparatus of claim 3, wherein the fix button is enabled when the at least one detailed status button associated with a listed component displays a problem status, and when activated, causes the cable diagnostics application to execute a fix action to fix the problem status, the fix action comprising copying a file or displaying a help file.

19. The apparatus of claim 18, wherein the help file is a picture illustrating to a user how to fix the problem status.

20. A method for directing a user to cable modem technical support comprising:

displaying a cable modem problem status in a hierarchical display, the hierarchical display comprising a summary page and a detail page associated with each of a plurality of functional areas related to a cable modem problem;

enabling a technical support button on the each of the detail pages;

displaying a technical support contact information when the user activates the technical support button, the technical support contact information tailored to the associated functional area, and wherein the technical support contact information is not otherwise visible;

displaying a detailed cable modem problem status for each of a plurality of cable modem components listed on the detail page;

enabling a fix button for the cable modem component related to the cable modem problem on the detail page; and disabling the technical support button until the user has attempted to fix the cable modem problem using the fix button.

21. The method of claim 20, wherein enabling the technical support button comprises activating the display of the button to respond to an input action entered by the user.

22. The method of claim 20, further comprising tailoring the technical support contact information to the particular cable modem component having the problem.

23. An article of manufacture comprising:

a machine-accessible medium having machine-executable instructions for performing:

displaying a cable modem problem status in a hierarchical display, the hierarchical display comprising a summary page and a detail page associated with each of a plurality of functional areas related to a cable modem problem;

enabling a technical support button on the each of the detail pages;

displaying a technical support contact information when the user activates the technical support button, the technical support contact information tailored to the associated functional area, and wherein the technical support contact information is not otherwise visible;

displaying a detailed cable modem problem status for each of a plurality of cable modem components listed on the detail page;

enabling a fix button for the cable modem component related to the cable modem problem on the detail page; and disabling the technical support button until the user has attempted to fix the cable modem problem using the fix button.

24. The article of manufacture of claim 23, wherein machine-executable instructions for performing enabling the technical support button comprises activating the display of the button to respond to an input action entered by the user.

25. The article of manufacture of claim 23, wherein the machine-executable instructions for performing further include tailoring the technical support contact information to the particular cable modem component having the problem.

* * * * *